(12) United States Patent
Kruse

(10) Patent No.: US 6,293,009 B1
(45) Date of Patent: Sep. 25, 2001

(54) METHOD FOR PRODUCING A METALLIC CARRIER BODY AND METALLIC CARRIER BODY FOR AN EXHAUST GAS SYSTEM OF AN INTERNAL COMBUSTION ENGINE

(75) Inventor: Carsten Kruse, Lohmar (DE)

(73) Assignee: Emitec Gesellschaft fuer Emissionstechnologie, Lohmar (DE)

( * ) Notice: Subject to any disclaimer, the term of this patent is extended or adjusted under 35 U.S.C. 154(b) by 0 days.

(21) Appl. No.: 09/156,743

(22) Filed: Sep. 17, 1998

(30) Foreign Application Priority Data

Sep. 17, 1997 (DE) .............................................. 197 40 966

(51) Int. Cl.⁷ ................................................ B21D 52/16
(52) U.S. Cl. .................................. 29/890; 422/177; 53/429
(58) Field of Search ............................... 29/890; 422/177; 53/117, 429, 430

(56) References Cited

U.S. PATENT DOCUMENTS

| | | | |
|---|---|---|---|
| 3,966,443 | * 6/1976 | Okano et al. ........................... | 55/337 |
| 4,518,075 | * 5/1985 | Aykut et al. ........................... | 198/460 |
| 4,782,570 | * 11/1988 | Spridco ............................... | 29/157 R |
| 5,518,569 | * 5/1996 | Achilles et al. ........................ | 156/250 |
| 6,035,608 | * 3/2000 | O'Connor ............................... | 53/429 |

OTHER PUBLICATIONS

Published International Application No. 92/02716 (Maus et al.), dated Feb. 20, 1992.

Published International Application No. 92/02717 (Reck), dated Feb. 20, 1992.

* cited by examiner

Primary Examiner—S. Thomas Hughes
Assistant Examiner—John C. Hong
(74) Attorney, Agent, or Firm—Herbert L. Lerner; Laurence A. Greenberg; Werner H. Stemer

(57) ABSTRACT

A method for producing a metallic carrier body includes introducing a sheet into a receptacle. The sheet undergoes at least partial deformation upon introduction into the receptacle. A catalyst carrier body for an exhaust gas system of an internal combustion engine may be produced by the method.

21 Claims, 2 Drawing Sheets

METHOD FOR PRODUCING A METALLIC CARRIER BODY AND METALLIC CARRIER BODY FOR AN EXHAUST GAS SYSTEM OF AN INTERNAL COMBUSTION ENGINE

BACKGROUND OF THE INVENTION

Field of the Invention

The present invention relates to a method for producing a metallic carrier body. The invention also relates to a metallic carrier body, in particular a catalyst carrier body for exhaust gas systems of internal combustion engines.

Metallic carrier bodies, which are also referred to as honeycomb bodies, in particular catalyst carrier bodies for exhaust gas systems of internal combustion engines, are known, for example, from International Publication Nos. WO 92/02717 and WO 92/02716.

A feature common to all of those bodies is that they are formed of a plurality of individual sheets or layers which are at least partially structured. The sheets delimit flow channels, through which an exhaust gas can flow. The sheets are wound or coiled one around the other in order to form individual gas channels.

The activity of a catalyst carrier body, which is disposed within an exhaust gas system of an internal combustion engine, depends, inter alia, on the flow conditions in a metallic carrier body. In order to improve the flow conditions, it is proposed, according to International Publication No. WO 92/02717, that at least part of the sheets have structures running approximately parallel to the direction of flow. In at least part of those structured sheets the structures have structure heights and/or structure widths narrowing continuously or in steps in order to form channels having different cross-sectional areas. Another proposal for improving effectiveness and/or the flow conditions in a metallic carrier body is described in International Publication No. WO 92/02716, mentioned above. According to that publication, it is proposed that, as seen in the direction of flow of the channels, the carrier body be constructed in such a way that the number of channels per cross-sectional area, and consequently the cross-sectional area of individual channels, vary in different portions located one behind the other in the direction of flow.

Such carrier bodies have high effectiveness and a favorable flow behavior, which is advantageous particularly in the case of large exhaust gas volumes.

Such metallic honeycomb bodies are produced by laminating at least partially structured sheets so as to form at least one stack. The laminated stack or laminated stacks are subsequently coiled at least partially one around the other. The stacks that are coiled one around the other are thereafter introduced into a casing tube. The carrier body which is thus produced subsequently has brazing material applied to it and is subjected to a brazing operation, with the result that the individual sheets are connected to one another. In addition, a connection may be made between the sheets or layers and the casing tube. The outlay for producing such carrier bodies is relatively high.

SUMMARY OF THE INVENTION

It is accordingly an object of the invention to provide a method for producing a metallic carrier body, and a metallic carrier body for an exhaust gas system of an internal combustion engine, which overcome the hereinafore-mentioned disadvantages of the heretofore-known methods and devices of this general type and in which the method simplifies the production of the carrier body and the carrier body has a simplified structure and high effectiveness.

With the foregoing and other objects in view there is provided, in accordance with the invention, a method for producing a metallic carrier body, in particular a catalyst carrier body for an exhaust gas system of an internal combustion engine, which comprises introducing at least one sheet into a receptacle while undergoing at least partial deformation of the at least one sheet.

The concept according to the invention of a method for producing a metallic carrier body, in particular a catalyst carrier body for an exhaust gas system of an internal combustion engine, follows an entirely novel route in order to produce metallic carrier bodies. Contrary to the known production method, in which an ordered structure of the carrier body is always formed, it is proposed, in the method according to the invention, to introduce at least one sheet into a receptacle, with that sheet at the same time undergoing at least partial deformation. The structure of the gas passages within the carrier body is produced through the use of the deformed sheet. An essentially completely unordered structure of gas passages, which communicate with one another, arises within the receptacle. This ensures that, when an exhaust gas flows through such a carrier body, it undergoes very good intermixing which leads to high effectiveness of a metallic carrier body used as a catalyst carrier body.

The method according to the invention also has the advantage of ensuring that there is no longer any need for lamination or stack formation before the actual production of the metallic carrier body.

It is possible to influence the essentially unordered structure of the carrier body by a suitable choice or variation of production parameters.

In accordance with another mode of the invention, the at least one sheet is introduced into the receptacle at a substantially constant speed during the production operation. This simplifies the production operation substantially, since there is no need for any complicated devices in order to produce the metallic carrier body. Another advantage of this procedure is that the deformation behavior of the sheet, which is introduced into the receptacle at a substantially constant speed, is always similar.

In order to increase the effectiveness of the production method, it is proposed to introduce a plurality of sheets into the receptacle simultaneously. These sheets influence one another in that they are at least partially deformed while they are being introduced into the receptacle.

In accordance with a further mode of the invention, when a plurality of sheets are introduced into the receptacle simultaneously, each sheet is introduced into the receptacle at a substantially constant speed. A method in which the speed of each sheet is substantially identical is preferred. It is thereby possible to convey all of the sheets into the receptacle through the use of a single drive.

The loading of the carrier body with at least one sheet and therefore also the size of a catalytically active surface also depend on the degree of deformation of the sheet.

In accordance with an added mode of the invention, the speed of each sheet is different in order to obtain portions which have different deformations within the carrier body and therefore to produce different portions of catalytically active surface. Preferably, the speed of at least one sheet is varied during the production operation. A method in which each sheet is introduced into the receptacle at varying speed is preferred. Varying the speed of each sheet in this way affords the possibility of producing a metallic carrier body which is adapted to a predetermined use or intended use.

In accordance with an additional mode of the invention, each sheet is introduced at substantially identically varying speeds. Alternatively, each sheet may be introduced into the receptacle at differently varying speeds.

In accordance with yet another mode of the invention, at least the direction in which at least one sheet is introduced into the receptacle is substantially constant, which also simplifies the production of a metallic carrier body. When a plurality of sheets are introduced into the receptacle, it is preferable that the direction in which each sheet is introduced into the receptacle is substantially constant.

In accordance with yet a further mode of the invention, in order to prevent zones in which there are large gas channels from occurring within the receptacle, the direction in which at least one sheet is introduced into the receptacle is varied. This may also take place correspondingly when a plurality of sheets are introduced into the receptacle. In this case, an identical variation in the direction of each sheet takes place. This measure also has the advantage of permitting the production of carrier bodies having a varying cross section. These may, for example, be conically constructed carrier bodies.

In accordance with yet an added mode of the invention, at least one substantially elongate sheet is introduced, with a twist about its own longitudinal axis, into the receptacle. This is done in order to improve the deformation of at least one sheet when it is introduced into the receptacle.

In accordance with yet an additional mode of the invention, at least one sheet is introduced in the form of a band-like sheet into the receptacle. A method in which each band-like sheet is introduced into the receptacle until a respective predetermined loading density of the latter is achieved is preferred.

In accordance with again another mode of the invention, at least one sheet in the form of sheet portions is introduced into the receptacle until a predetermined loading is achieved, in order to achieve a relatively high loading of the receptacle with a sheet. These sheet portions are preferably introduced into the receptacle in succession. A plurality of sheet portions may also be introduced into the receptacle simultaneously from different directions and at different speeds.

In accordance with again a further mode of the invention, in order to introduce individual sheet portions into the receptacle, the individual sheet portions are accelerated in an introduction station before being introduced into the receptacle. The individual sheet portions are virtually shot into the receptacle. Since the individual sheet portions bump against a wall surface, preferably a baffle wall surface surface, and/or against sheet portions already located in the receptacle, they are deformed. Simultaneous deformation of the sheet portions already located in the receptacle and of those penetrating into the receptacle therefore takes place. The extent of the deformation of the sheets or sheet portions already located in the receptacle and of those being introduced into the receptacle depends on the momentum occurring between the individual sheet portions or sheets. If the agglomerate of sheets or sheet portions which has already formed in the receptacle may be considered as a relatively hard body, relatively high deformation of the sheet penetrating into the receptacle takes place when it collides with this agglomerate.

In accordance with again an added mode of the invention, the speed and/or the direction and/or the twist and/or the form of the sheet and/or the acceleration of the sheet portions are varied in dependence on the loading density of the receptacle. If the carrier body is produced, for example, from a band-like sheet, the latter may also be introduced into the receptacle with different accelerations during the production operation.

In accordance with again an additional mode of the invention, at least one sheet is introduced into a receptacle which is delimited at least partially by a casing tube of the carrier body and by a baffle wall surface. The baffle wall surface is disposed in an orifice cross section of the casing tube. When at least one sheet is introduced into the casing tube substantially in the axial direction of the latter, that sheet is deformed when it collides with the baffle wall surface. Further deformations may occur due to the fact that the sheet bumps against the casing tube or against the sheet already located in the casing tube.

In accordance with still another mode of the invention, at least one sheet is structured before being introduced into the receptacle, in order to improve the deformability of the sheet. The sheet may be given a corrugated structure, for example.

In accordance with still a further mode of the invention, at least part of a surface of at least one sheet is made catalytically active, before the at least one sheet is introduced into the receptacle.

With the objects of the invention in view, there is also provided a metallic carrier body, in particular a catalyst carrier body for an exhaust gas system of an internal combustion engine, comprising a casing tube; and at least one sheet disposed in the casing tube and forming gas channels; the at least one sheet being at least partially deformed and the gas channels being at least partially delimited, upon introduction of the at least one sheet into the casing tube.

In accordance with another feature of the invention, the sheet has a band-like structure.

In accordance with a further feature of the invention, the sheet is in the form of sheet portions. The sheet portions and/or the sheet may have an irregular shape and/or form.

In accordance with an added feature of the invention, at least one sheet is structured at least partially before being introduced into the receptacle.

In accordance with a concomitant feature of the invention, if the carrier body serves as a catalyst carrier body, at least part of a surface of at least one sheet is catalytically active.

Other features which are considered as characteristic for the invention are set forth in the appended claims.

Although the invention is illustrated and described herein as embodied in a method for producing a metallic carrier body and a metallic carrier body for an exhaust gas system of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
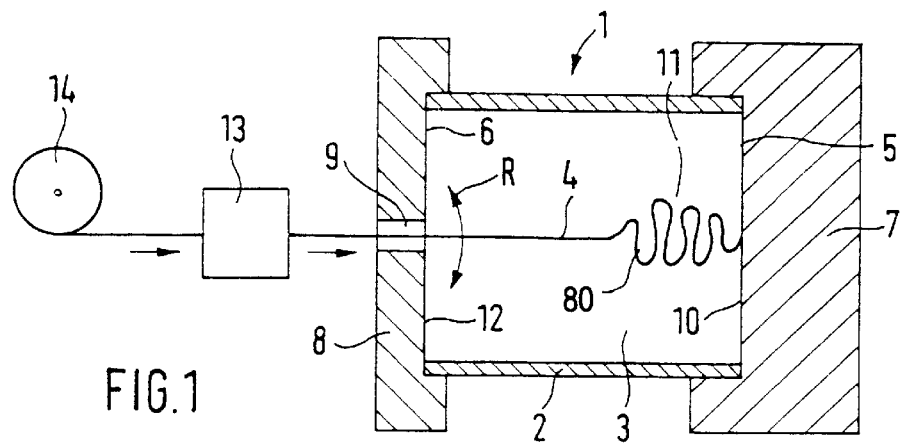
FIG. 1 is a diagrammatic, sectional view of a snapshot of an operation for producing a carrier body with one band-like sheet.

Referring now to the figures of the drawings in detail and first, particularly, to FIG. 1 thereof, there is seen a snapshot of an operation for producing a carrier body 1. The carrier body 1 includes a casing tube 2 with a deformed sheet 4 disposed in the casing tube. The casing tube 2 has a first orifice 5 and a second orifice 6. The orifices 5, 6 have a cross section which corresponds substantially to an inner cross section of the casing tube 2. The first orifice 5 is closed through the use of a first baffle body 7. The second orifice 6 is partially closed through the use of a second baffle body 8. The casing tube 2, first baffle body 7 and second baffle body 8 delimit a receptacle 3. An entry orifice 9 is constructed in the second baffle body 8. The entry orifice 9 extends through the second baffle body 8 and opens out in the receptacle 3.

The band-like sheet 4 is introduced, preferably at high speed, through the entry orifice 9. The band-like sheet 4 passes through the entry orifice 9 into the receptacle 3. In this case, a front region of the band-like sheet 4 bumps against a wall surface 10 constructed on the first baffle body 7. The band-like sheet 4 is deformed as a result of this collision of the band-like sheet which is introduced continuously into the receptacle 3. A deformed portion of the band-like sheet 4 is designated by reference numeral 11.

The band-like sheet 4 is introduced into the receptacle 3 until a predetermined loading with the band-like sheet 4 has been achieved in the receptacle 3. The speed at which the band-like sheet 4 is introduced into the receptacle 3 may be constant during the entire production operation. However, it may also vary. The second baffle body 8 is provided in order to prevent the band-like sheet 4 to be introduced into the receptacle 3 from projecting out of the latter toward the end of the production operation. The second baffle body 8 has a wall surface 12, the function of which corresponds essentially to the function of the wall surface 10 of the first baffle body 7.

The entry orifice 9 is adapted to the cross section of the band-like sheet 4. The entry orifice 9 may also have a cross section widening toward the receptacle 3, thereby making it possible to vary the direction in which the sheet is introduced into the receptacle 3. Arrows R indicate that, during the introduction operation, the band-like sheet 4 can be deflected out of the position illustrated, thereby changing the direction of introduction of the band-like sheet 4. The change in the direction of introduction of the band-like sheet 4 may take place at any time during the production operation. It may fluctuate between two maximum deflections. Fluctuation preferably takes place sinusoidally. The amplitude of the deflection in the direction of introduction is preferably adapted to the degree of loading of the receptacle 3. In the initial stage of the production operation, the amplitude of the deflection in the direction of introduction preferably corresponds to the diameter of the casing tube 2.

The band-like sheet 4 is introduced into the receptacle 3 through the use of an introduction station 13. The band-like sheet 4 is unwound from a stock roll 14 for this purpose.

After the band-like sheet 4 has been introduced into the receptacle 3 in conformity with the desired loading, the band-like sheet 4 is severed. The finished carrier body 1 can be removed.

Figure 2:
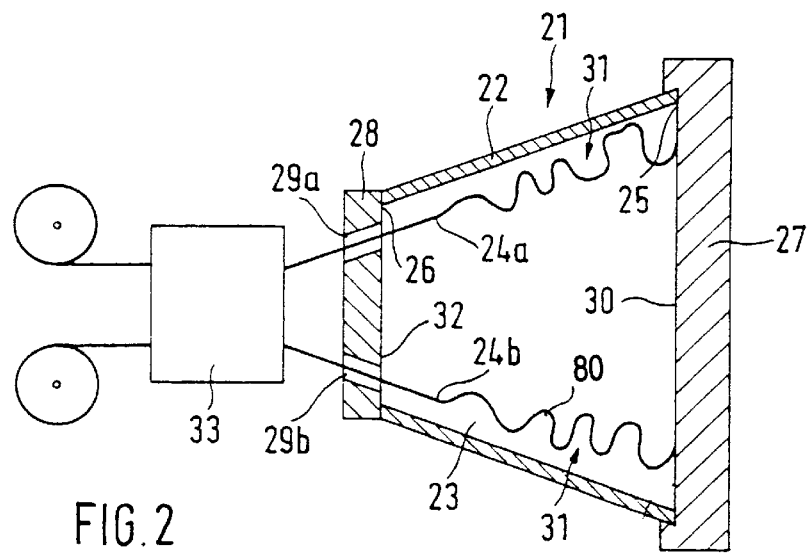
FIG. 2 is a sectional view of a snapshot of an operation for producing a carrier body with two band-like sheets.

FIG. 2 illustrates a snapshot of an operation for producing a carrier body 21. The carrier body 21 has a conically constructed casing tube 22. A first orifice 25 of the casing tube 22 is closed through the use of a first baffle body 27. A second orifice 26 of the casing tube 22 is partially closed through the use of a second baffle body 28. The casing tube 22, the first baffle body 27 and the second baffle body 28 delimit a receptacle 23.

The first baffle body 28 has entry orifices 29a and 29b constructed at a distance from one another. In the illustrated exemplary embodiment, the second baffle body 28 is disposed in the vicinity of the smaller second orifice 26 of the conically widening casing tube 22. It may be expedient to place the second baffle body at the orifice 25.

A band-like sheet 24a passes through the entry orifice 29a into the receptacle 23. A band-like sheet 24b passes through the entry orifice 29b. The band-like sheets 24a, 24b pass simultaneously into the receptacle 23. When the receptacle is still empty, the respective ends of the sheets 24a, 24b bump against a wall surface 30 of the first baffle body 27. As a result of the collision of the band-like sheets 24a, 24b with the wall surface 30, they are deformed and acquire deformation portions 31 which are illustrated diagrammatically in FIG. 2. The deformation portions 31 delimit gas passages in the finished carrier body 21. The band-like sheets 24a, 24b may have the same shape. The sheets 24a, 24b are introduced through an introduction station 33 which has a common, non-illustrated drive for introducing the two sheets 24a, 24b. The number of band-like sheets 24a, 24b may be adapted according to production requirements.

Figure 3:
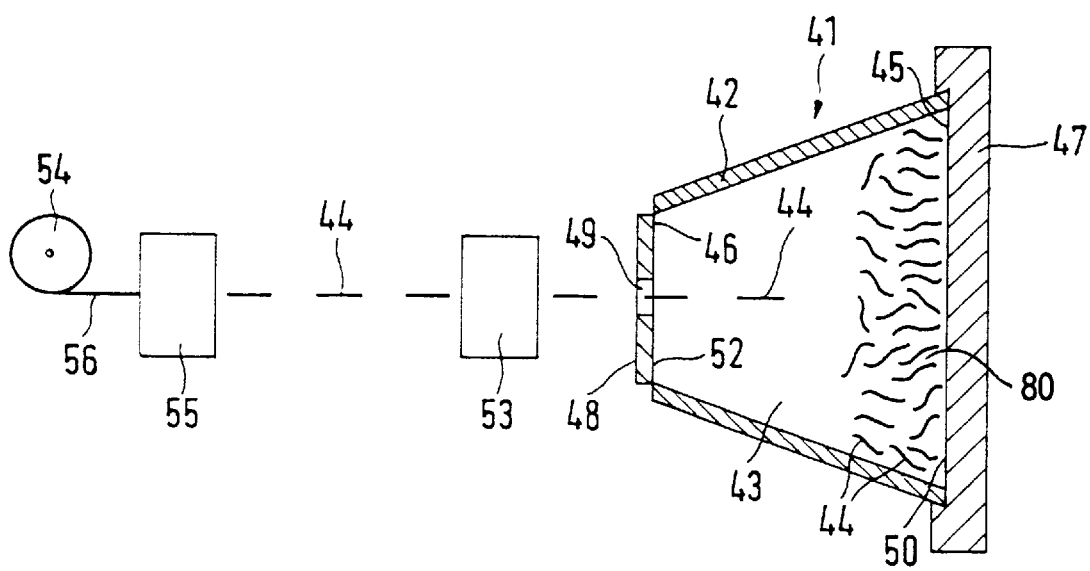
FIG. 3 is a sectional view of a snapshot of an operation for producing a carrier body with sheet portions.

Another possibility for producing a carrier body 41 is shown in FIG. 3. In the illustrated exemplary embodiment, the carrier body 41 has, for example, a conically constructed casing tube 42. Respective orifices 45 and 46 of the conically constructed casing tube are respectively closed through the use of a first baffle body 47 and a second baffle body 48. The second baffle body 48 has an entry orifice 49, through which a sheet can be introduced into a receptacle 43. The sheet preferably is formed of strip-like sheet portions 44. The sheet portions 44 are accelerated in an introduction station, in such a way that they pass in free flight through the orifice 49 into the receptacle 43. In the illustrated exemplary embodiment, an introduction station 53 is shown at a distance from the second baffle body 48. However, the second baffle body 48 may be an integral part of the introduction station 53.

The receptacle 43 is delimited by the casing tube 42, the first baffle body 47 and the second baffle body 48. The sheet portions 44 introduced into the receptacle 43 bump against a wall surface 50 of the first baffle body 47. Due to the impingement of the individual sheet portions 44 against the wall surface 50, they are deformed, as indicated in FIG. 3. If a multiplicity of sheet portions 44 have already been introduced into the receptacle 43, further sheet portions are deformed by impinging onto the deformed sheet portions 44 that are already present and compression of the deformed sheet portions which are already present in the receptacle 43 takes place simultaneously. A relatively low degree of spacing can be achieved when a carrier body is produced with sheet portions. The degree of spacing refers to the ratio of a space volume to the volume of the receptacle. The space volume is understood as the difference between the volume of the receptacle and the total volume of the sheet portions 44 being introduced.

The sheet portions 44 are fed sequentially to the introduction station 53. Feeding takes place through a feed station 55. In the feed station 55, the sheet portions 44 are formed by being cut to length from a sheet band 56 which is unrolled from a stock roll 54.

In the exemplary embodiment illustrated in FIG. 3, the sheet portions 44 are brought into the receptacle 43 through the entry orifice 49. It may be expedient to introduce sheet portions 44 through a further entry orifice in the second baffle body 48. During the operation of producing the honeycomb body, the accelerations of the sheet portions 44 may be constant. A variation in the acceleration of the sheet portions 44 is preferred, since a virtually laminated carrier body can be achieved thereby. A different number of gas channels are formed in the individual laminations or layers of the carrier body. In other words, the degree of spacing of the individual laminations is different.

Figure 4:
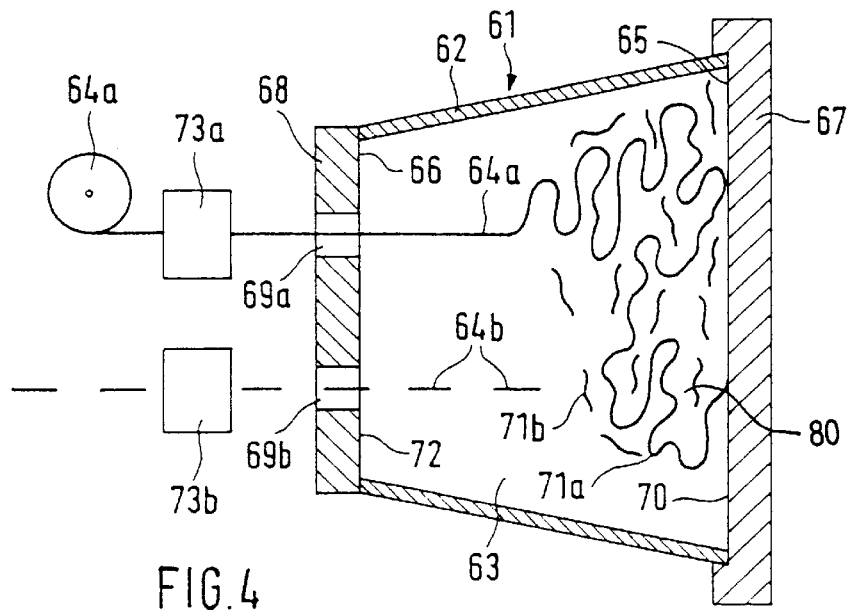
FIG. 4 is a sectional view of a snapshot of an operation for producing a carrier body with one band-like sheet and with sheet portions.

FIG. 4 diagrammatically illustrates a snapshot of an operation for producing a metallic carrier body 61. The metallic carrier body 61 has a casing tube 62. A first orifice 65 of the casing tube 62 is closed through the use of a first baffle body 67. A second orifice 66 of the casing tube 62 is partially closed through the use of a second baffle body 68. The casing tube 62, the first baffle body 67 and the second baffle body 68 delimit a receptacle 63.

The second baffle body 68 has two entry orifices 69a and 69b constructed at a distance from one another. In the exemplary embodiment illustrated in FIG. 4, a band-like sheet 64a passes through the entry orifice 69a. Sheet portions 64b are introduced through the entry orifice 69b. The finished carrier body 61 includes the band-like sheet 64a and a multiplicity of the sheet portions 64b. During the operation of introducing the band-like sheet 64a and the sheet portions 64b, they are deformed and they fill the receptacle 63. When a specific loading of the receptacle 63 is achieved, the production operation is terminated. An introduction station 73a is provided for the penetration of the band-like sheet 64a which is unwound from a stock roll 64c. The sheet portions 64b are introduced through an introduction station 73b.

A finished carrier body 1, 21, 41 or 61 has a multiplicity of gas channels 80 which are delimited by a sheet or layers in the form of a band-like sheet 4, 24a, 24b, 64a and/or a sheet or layers in the form of sheet portions 44, 64b.

Figure 5:
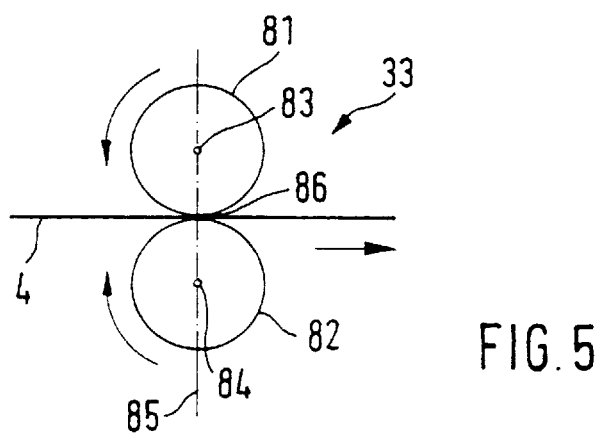
FIG. 5 is an elevational view of a first exemplary embodiment of an introduction station.

An exemplary embodiment of an introduction station 33 is illustrated diagrammatically in FIG. 5. The introduction station 33 has two essentially cylindrical rollers 81, 82. Respective axes 83, 84 of the rollers 81, 82 run parallel to one another and lie along a common straight line 85. A spacing of the axes 83, 84 along the straight line 85 is somewhat smaller than a sum of the radii of the rollers 81, 82, with the result that a nip 86 is formed between outer surfaces of the rollers 81, 82. The height of the nip 86 is preferably somewhat smaller than the height of the sheet 4 which is conveyed frictionally between the rollers 81, 82. During conveyance through the rollers 81, 82, the sheet 4 can be given a structure, in particular a corrugated structure. For this purpose, the rollers 81, 82 are constructed with teeth which are formed on the outer periphery and which engage in one another during the rolling operation. At least one of the rollers 81, 82 can be driven by a motor drive which is not illustrated. The drive can preferably be controlled in such a way that the speed at which the sheet 4 is introduced into a receptacle can be varied.

Figure 6:
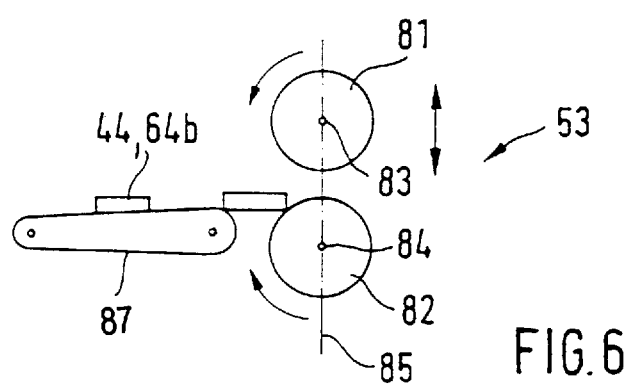
FIG. 6 is an elevational view of a second exemplary embodiment of an introduction station.

An introduction station 53, as illustrated in FIG. 6, is preferably used in order to introduce sheet portions 44 or 64b. The introduction station 53 includes two cylindrical rollers 81, 82. The roller 81 is rotatable about an axis 83 and the roller 82 about an axis 84. The axes 83, 84 extend parallel to one another and they lie along a common straight line 85. The cylindrical roller 81 is displaceable back and forth along the straight line 85. The roller 81 is connected to a drive, so that this roller 81 is set in rotation about its axis 83. Sheet portions 44 are applied sequentially onto the outer surface of the roller 82 by a conveying device 87. When a sheet portion 44 has reached a predetermined position on the outer surface of the roller 82, the rotating roller 81 is displaced along the straight line 85 in the direction of the roller 82, so that the outer surface of the roller 81 comes into contact with the sheet portion 44 and the sheet portion is accelerated by the rotating roller 81. A stop is preferably provided for the roller 81, so that the travel of the roller 81 is limited in such a way that the outer surface of the roller 81 does not come to bear on the outer surface of the roller 82.

After a sheet portion 44 has been accelerated by the rotating rollers 81, 82 and the sheet portion 44 has left a region of engagement with the outer surface of the rollers 81, 82, the roller 81 is moved back into its original position and a further sheet portion 44 is positioned on the outer surface of the roller 82. The operation is repeated in the manner described.

I claim:

1. A method for producing a metallic carrier body, which comprises:

at least partially delimiting a receptacle with a casing tube of a metallic carrier body having an orifice and with at least one baffle wall surface;

introducing at least one sheet through said orifice of the casing tube into the receptacle;

bumping the at least one sheet against the baffle wall surface or sheet portions already located in the receptacle; and undergoing at least partial, unguided and random, deformation of the at least one sheet.

2. The method according to claim 1, which comprises carrying out the step of introducing the at least one sheet into the receptacle at a substantially constant speed.

3. The method according to claim 2, which comprises carrying out the step of introducing the at least one sheet into the receptacle by introducing each of a plurality of sheets into the receptacle at a substantially constant speed.

4. The method according to claim 3, which comprises setting the speed of each sheet to be substantially identical.

5. The method according to claim 3, which comprises setting the speed of each sheet to be different.

6. The method according to claim 1, which comprises varying a speed of introduction of the at least one sheet into the receptacle during a production operation.

7. The method according to claim 6, which comprises varying a speed of introduction of each of a plurality of sheets into the receptacle.

8. The method according to claim 7, which comprises introducing each sheet into the receptacle at substantially identically varying speeds.

9. The method according to claim 6, which comprises introducing each sheet into the receptacle at differently varying speeds.

10. The method according to claim 1, which comprises maintaining at least a substantially constant direction in which the at least one sheet is introduced into the receptacle.

11. The method according to claim 10, which comprises maintaining a substantially constant direction in which each of a plurality of sheets is introduced into the receptacle.

12. The method according to claim 1, which comprises varying a direction in which the at least one sheet is introduced into the receptacle.

13. The method according to claim 12, which comprises substantially identically varying the direction in which each of a plurality of sheets is introduced into the receptacle.

14. The method according to claim 1, which comprises introducing the at least one sheet in the form of a band-like sheet into the receptacle.

15. The method according to claim 14, which comprises introducing each of a plurality of band-like sheets into the receptacle until a respective predetermined loading of the receptacle is achieved.

16. The method according to claim 1, which comprises introducing the at least one sheet in the form of sheet portions into the receptacle until a predetermined loading is achieved.

17. The method according to claim 16, which comprises introducing the sheet portions into the receptacle in succession.

18. The method according to claim 17, which comprises accelerating the sheet portions individually in an introduction station before being introduced into the receptacle.

19. The method according to claim 1, which comprises structuring the at least one sheet before being introduced into the receptacle.

20. The method according to claim 1, which comprises making at least part of a surface of the at least one sheet catalytically active before the at least one sheet is introduced into the receptacle.

21. A method for producing a metallic carrier body for an exhaust gas system of an internal combustion engine, which comprises:

at least partially delimiting a receptacle with a casing tube of a metallic carrier body having an orifice and with at least one baffle wall surface;

introducing at least one sheet through the orifice of the casing tube into the receptacle while;

bumping the at least one sheet against the baffle wall surface or sheet portions already located in said receptacle; and undergoing at least partial, unguided and random, deformation of the at least one sheet.

* * * * *